United States Patent
Chandraiah et al.

(10) Patent No.: US 6,600,859 B2
(45) Date of Patent: Jul. 29, 2003

(54) COMPOSITE MODULAR OPTICAL FIBER RIBBON

(75) Inventors: Vidyananda B. Chandraiah, Lawrenceville, GA (US); Kenneth W. Jackson, Snellville, GA (US); Kariofilis Konstadinidis, Decatur, GA (US); Richard Dalton Small, Lilburn, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/897,684

(22) Filed: Jul. 2, 2001

(65) Prior Publication Data

US 2003/0002831 A1 Jan. 2, 2003

(51) Int. Cl.⁷ .................................................. G02B 6/44
(52) U.S. Cl. ........................ 385/114; 385/100; 385/127; 385/128; 385/141
(58) Field of Search ........................ 385/100–114, 127, 385/128, 141, 147

(56) References Cited

U.S. PATENT DOCUMENTS

| | | | |
|---|---|---|---|
| 4,900,126 A | 2/1990 | Jackson et al. | 385/114 |
| 5,524,164 A * | 6/1996 | Hattori et al. | 385/114 |
| 5,809,195 A | 9/1998 | Brown et al. | 385/114 |
| 5,905,835 A | 5/1999 | Bourghelle et al. | 385/114 |
| 6,134,364 A | 10/2000 | DeFabritis et al. | 385/114 |
| 6,253,013 B1 | 6/2001 | Lochkovic et al. | |

FOREIGN PATENT DOCUMENTS

EP  0922980 A2  6/1999

* cited by examiner

*Primary Examiner*—Lynn Feild
*Assistant Examiner*—Son V. Nguyen
(74) *Attorney, Agent, or Firm*—Thomas, Kayden, Horstemeyer & Risley, LLP

(57) ABSTRACT

A composite modular optical fiber ribbon structure has one or more separate sub-ribbons, each encased in a first matrix having a relatively high elastic modulus at room temperature. The sub-ribbons are assembled in a planar array which is encased in a second matrix having a relatively low elastic modulus at room temperature.

10 Claims, 2 Drawing Sheets

COMPOSITE MODULAR OPTICAL FIBER RIBBON

FIELD OF THE INVENTION

This invention relates to optical fiber ribbons and, more particularly, to a ribbon bonding matrix arrangement for facilitating access to fibers and fiber subunits in the ribbon.

BACKGROUND OF THE INVENTION

Optical fiber cable development, wherein the cable is capable of multi-channel transmission, has resulted in the use of bonded arrays of fibers forming a planar ribbon, which may be stacked within a core tube or sheath to produce high operative capacity. Typically, a ribbon may comprise, for example, twelve fibers that are held in a spaced parallel array by a matrix. Splicing and connecting the individual fibers can be accomplished by splicing and connecting the entire planar ribbon in one operation provided that the fibers are positioned and fixed within the matrix.

In U.S. Pat. No. 4,900,126 of Jackson, et al., the disclosure of which is incorporated herein by reference, there is shown a bonded optical fiber ribbon that comprises a coplanar array of longitudinally extending parallel optical fibers in contact with each other. Each fiber is enclosed in inner and outer layers of coating materials and has a color identifier for differentiating each fiber from the other fibers. The inner layer comprises an ultra-violet curable bonding material having a modulus of approximately 1 MPa and an outer layer of an ultra-violet curable bonding material having a modulus of approximately 1 GPa for mechanical protection. With the fibers disposed in a parallel array, interstices are created between the fibers themselves and between the fibers and the envelope of the ribbon, which is a matrix formed of an ultra-violet curable bonding material having a modulus that is less than the modulus of the outer coating layer on the fiber and which is greater than the modulus of the modulus of the inner coating layer. The matrix material fills the interstices and bonds the fibers together and to the envelope to form a completed ribbon. The modulus and the surface characteristics of the matrix material and its bond to the color identifier material on each fiber are such that inter-ribbon movement can occur, thus the ribbons in a stack can slide relative to each other when the cable is bent and, also, that accessing of individual fibers is possible. The ribbons may be stacked such that eighteen ribbons, for example, having twelve fibers each, may be enclosed within a core tube to form the core of an optical fiber cable having two hundred and sixteen fibers, or, if preferred, channels. The core tube itself has an outside diameter (OD) of approximately 0.6 inches. Such an arrangement, which is in widespread use today, and now has extended to the design and manufacture of 864 and larger ribbon cables has proved adequate for most present day applications.

As pointed out in the aforementioned Jackson et al. patent, the color identifier material of each of the fibers should not be removed from the fiber when the bonding material is removed to access the fibers. Thus, the matrix material of the bonded ribbons is selected to have an interfacial bonding characteristic such that the bond interface of the matrix material and the coloring material is weaker than the bonding interface of the coloring material to the outermost coating on the optical fiber. In at least one embodiment of the invention of that patent, a release agent is applied over the coloring material prior to application of the matrix bonding material to facilitate separation of the matrix material therefrom. There remains a problem, however, in breaking out separate modules from the ribbon, and individual fibers from the module. In general, when it is desired to break out one or more modules from the ribbon, and one or more fibers from the module, a matrix cutting tool is used. Such a tool usually comprises a metallic blade having a cutting edge for slicing through the matrix, however, with such a tool, extreme care must be exercised to avoid nicking or otherwise damaging the fiber or fibers adjacent to the cut. Where, as is the case with the ribbon of the aforementioned Jackson et al. patent, the individual fibers are in actual contact with each other, the straight cutting edge of the blade is almost certain to contact the fiber, and avoidance of damage is extremely difficult. This problem is compounded by the fact that most such "break-outs" are performed in the field, under less than ideal conditions, and the installer or splicer is forced to proceed slowly and with extreme care. In addition, where, in a sixteen fiber ribbon, for example, the ribbon is divided into four modules of four fibers each, it is quite difficult to identify the line of separation between modules, and to cut along that line.

In U.S. Pat. No. 6,134,364 of DeFabritis, et al, the disclosure of which is incorporated herein by reference, there is shown an optical fiber ribbon in which the matrix material has certain characteristics, to be discussed in detail hereinafter, which enhance fiber access by increasing the strippability of the ribbon. With the increased strippability, individual fibers or groups thereof can be broken out while minimizing potential damage to the fibers.

The optical fiber network is moving more and more closely to the end user. Thus, the numbers of fibers required for optimal routing and interfacing with the lower or final stages of the network is considerably smaller than the number used for the main or trunk portion of the network. In the ultimate limit, a single two or four fiber ribbon may be all that is needed for the end user, depending on the level of redundancy used. However, lower fiber count ribbons present problems in production, primarily because economy of manufacture, e.g., high productivity is directly proportional to the ribbon fiber count. This relationship results from the fact that maximum ribbon line speed (in production) is limited by the flow dynamics and cure speed of the matrix, both of which are relatively independent of the fiber count per ribbon. An additional problem can arise in the packaging of the ribbons. A low fiber count ribbon being wound on a ribbon take-up spool can exhibit an instability, at least partially because of its narrowness, which can and often does lead to fiber breakage on de-spooling.

Thus, the DeFabritis arrangement is excellent for breaking out fibers from the ribbon, but does not completely satisfy the needs presented by low fiber count cables.

The currently used modular ribbon design is not suitable for continuous separation into long lengths (>km) of sub-ribbons that are needed for cables because the low adhesions required for single fiber access render such sub-ribbons mechanically unsuitable for cabling after separation. The requisite robustness cannot be achieved by increasing the adhesion of the matrix to the colored fibers without risk that the glass fiber itself will be separated from its protective coating during separation of the sub ribbons.

SUMMARY OF THE INVENTION

The present invention is a composite modular ribbon structure that comprises a plurality of optical fibers encased within a multiple-layer matrix. The structure and properties of the matrices are suitably chosen to allow high-speed separation of the composite structure into long lengths of robust sub-ribbons such as are typically required for cabling operations. The composite ribbon is sufficiently wide enough to form a robust, stable package on the take-up spool for cabling and ribbon transport.

In greater detail, in a preferred embodiment of the invention, the outermost matrix which may or may not occupy the intervening space between the sub-ribbons has low thickness, low modulus, low surface friction and narrower, and low tear strength, and has sufficient adhesion to the inner matrix forming the encased sub-ribbons so that their separation is achieved by tearing through the thin web formed by the envelope, thereby leaving a thin layer of the outer matrix bonded to the sub-ribbons. The outer matrix may be envisioned as a tough but easily tearable packaging material capable of being rendered with suitably low surface coefficient of friction such as the various types of plastic wraps for use in domestic kitchens. The primary desideratum of the outer matrix is that it is easily torn for separating out sub-ribbons at the high speeds typical of cabling operations. Such ease of tearing may be obtained with various means by those skilled in the art of material formulation which are not limited to just the material properties listed in the preferred embodiment. Thus, a plurality of low fiber count sub-ribbons, each containing an arbitrary number of fibers can be rapidly and continuously separated from the composite ribbon structure in a subsequent cabling or spooling operation without compromising the mechanical integrity of the sub-ribbons or the protective coating of the fiber. The sub-ribbons themselves are first formed in a multi-cavity die, passed through a curing oven, and then through an in-line die that applies the outermost matrix in a tandem operation. With this design/process, the fiber-km/hr throughput of the ribboning operation depends primarily on the maximum number of fibers that can be ribbonized in a single pass.

Thus, in accordance with the principles of the invention, the preferred embodiment may comprise a twenty-four fiber composite ribbon in which there are four sub-ribbons having six fibers each encased in a first matrix material, the characteristics of which are similar to, or the same as, those disclosed in the aforementioned DeFabritis et al patent. The sub-ribbons are arrayed side by side and the entire assembly is encased in a second matrix material which has a small thickness and low modulus and low tear strength, with sufficient adhesion to the first matrix material that their separation occurs by tearing through the web of the second material between or at the junction of, the sub-ribbons, with no effect on the robust sub-ribbons themselves. The thickness of the second matrix material, e.g., 10–30 μm is less than the thickness of the first matrix material, being thin enough to be tearable. Both the forming and separating can be performed in a single pass operation.

These and other principles and features of the present invention will be more readily apparent from the following detailed description, read in conjunction with the accompanying drawings.

DETAILED DESCRIPTION

Figure 1:
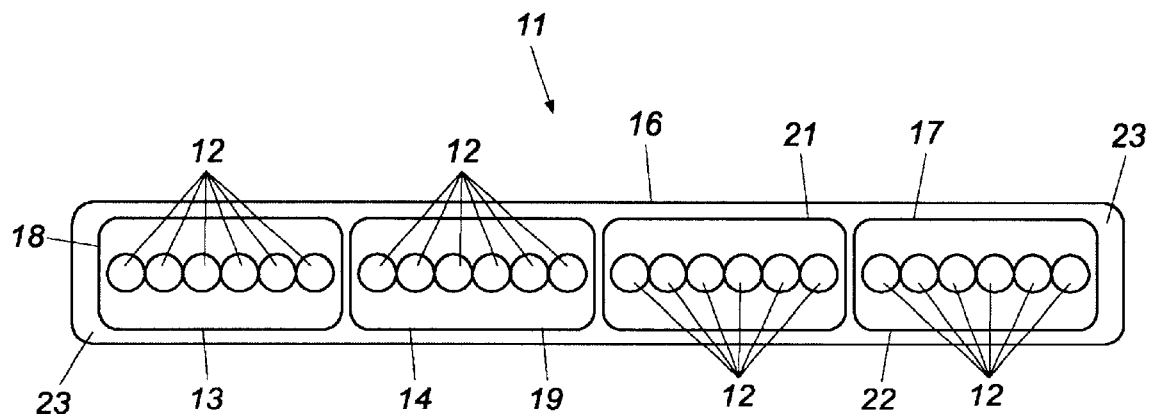
FIG. 1 is an elevation view in cross-section of the modular composite optical fiber ribbon of the invention.

In FIG. 1 there is shown in cross-section an embodiment of the invention comprising a composite modular ribbon 11 having twenty-four fibers 12 arrayed in four sub-ribbons 13, 14, 16, and 17 of six fibers each. The sub-ribbons 13–17 are, as shown, arrayed end to end in a parallel and planar configuration, each being encased in a first matrix 18, 19, 21, 22, the material of which is the same as, or approximates, the matrix material shown and described in the aforementioned DeFabritis patent. The assembly is unified by a second, outer matrix 23 which encases it and which may also fill the spaces and interstices between the sub-ribbons. The material of the second matrix 23 is, as will be discussed hereinafter, different than the first matrix material.

In the twenty-four fiber ribbon 11 of FIG. 1, the total thickness of a sub-ribbon is approximately 280 to 310 microns, and the thickness of the outer matrix layer is approximately 10 to 30 microns. It can be appreciated that with such small dimensions, accessing or breaking out the sub-ribbons in a predictable manner is important. Further, response of the assembly 11 to ambient conditions should be both gradual and predictable. To achieve these desiderata, the materials of both the first matrix 18, 19, 21, and 22 and of the second matrix 23 are disclosed hereinafter.

Figure 2:
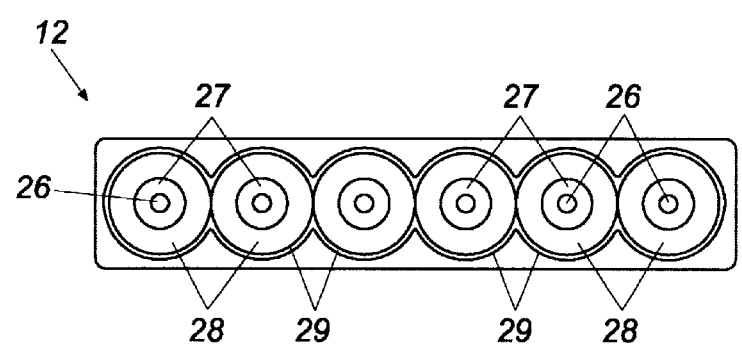
FIG. 2 is an elevation view in cross-section of a component of the ribbon of FIG. 1.

FIG. 2 is a cross-sectional view of, for example, sub-ribbon 13, having six fibers 12 encased within first matrix 18. Each fiber 12 comprises a core 26 and a cladding 27, a first, inner coating 28 and a second, outer coating 29, and the six fibers 12 are held within a common plane by matrix 18. Outer coating 29 preferably has an identifying colored ink thereon for facilitating identification of each fiber relative to the others. It is to be understood that outer coating 29 may have a colorant incorporated therein, or that inner coating 28 and outer coating 29 may be combined into a single coating containing a colorant or otherwise inked. It is virtually a necessity that the coloring layer, however constituted not be removed or otherwise obscured when matrix 18 is removed to gain access to individual fibers. This is treated at length in the aforementioned DeFabritis et al patent.

The UV curable matrix 18 material, which is the same for matrices 19, 21, and 22 is basically the same as that disclosed in the DeFabritis patent and is, for example, a mixture comprising a resin, a diluent, and a photoinitiator. * The resin may include an aliphatic or aromatic urethane acrylate and/or an epoxy acrylate/methacrylate. The diluent may comprise monofunctional or multifunctional acrylic acid esters having a molecular weight of 100–1000 Dalton. For the photoinitiator, the composition may include ketonic compounds such as 1-hydroxycyclohexyl phenyl ketone, diethoxyacetophenone, acetophenone, benzophenone, benzoin, anthraquinone, and benzil dimethyl ketal. In composition, the bonding matrix may include 50–90 percent weight resin, 5 to 10 percent diluents, and 1 to 10 percent photoinitiator. Additives containing silicon (Si) or fluorine (F) atoms may be added to improve the release properties of the bonding material. A UV curable coloring material (UV ink) is a mixture similar to that of the UV bonding material with the addition of pigments to achieve the desired color.

Another important property of the matrix bonding material is its modulus as related to temperature. Ideally, the modulus should not change significantly over the expected temperature range of operation, generally considered as −40° F. to 180° F. Where the fiber has a dual coating, layers 28 and 29, inner layer 28 generally has a modulus of about 1 MPa at room temperature and the outer layer 29 has a modulus of approximately 1 GPa at room temperature. The matrix material 18 is a UV curable bonding material which has a modulus greater than 1 MPa, preferably in the range of 400–1200 MPa at room temperature. A higher modulus material may be used when the inner layer 28 comprises a relatively low modulus material. If the modulus is relatively high, thereby insuring sufficient mechanical strength, the release agent which may be incorporated either into or out of the fiber colorant or encasing material insures an easy separation at the interface between the fiber colorant and the matrix 18 so that the colorant remains with the fiber where the matrix is removed.

These and other characteristics of the material 18 (and 19, 21, and 22) as laid out in the DeFabritis et al. patent are as follows:

(a) An elastic modulus at room temperature of 400–1200 MPa.
(b) An elastic modulus at 100° C. of 100–280 MPa.
(c) An elastic modulus at temperatures greater than 170° C. of 15–45 MPa.
(d) A glass transition temperature greater than 100° C.
(e) The matrix swells in alcohol more than 15% by volume at least to a swell plateau.
(f) The matrix reaches the percent swell plateau in more than one minute and less than twenty minutes.
(g) The matrix swells less than 5% by volume after 24 hours in commercially available cleaning solvents.
(h) The surface tension of the matrix is 20–35 mJ/m$^2$.
(i) The surface tension of the color coding inks is 25–30 mJ/m$^2$.
(j) The residual acrylate unsaturation (RAU) of the UV colored fiber surface is 2–17% (the amount of unreacted ink)
(k) The residual acrylate unsaturation (RAU) of the outer surface of matrix 18 is 2–17% (the amount of unreacted matrix 18).

Thus, it can be seen that each of the sub-ribbons 13, 14, 16, and 17 is a robust stand alone ribbon in accordance with the teaching of the DeFabritis patent. While sub-ribbons 13, 14, 16, and 17 have been shown as each containing six arrayed fibers 12, it is to be understood that there can be fewer fibers 12 or more fibers 12 depending upon the desired capacity of each sub-ribbon.

Figure 3:
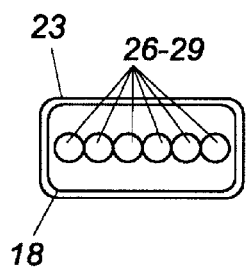
FIG. 3 is an elevation view in cross-section of the component of FIG. 2 after break-out from the ribbon of FIG. 1.

As discussed hereinbefore, the invention further comprises the second or outer matrix 23 which makes it possible to create the ribbon shown in FIG. 1 which, among other characteristics, is a robust, stable package when wound upon the take-up or shipping (transporting) spool. In order that the sub-ribbons 13, 14, 16, and 17 be readily accessible for breaking out as, for example, independent ribbons, the second or outer matrix has low modulus and low tear strength, and a low thickness, being thinner than matrix 18, yet has sufficient adhesion to the inner matrices 18, 19, 21, and 22 to present a robust, stable ribbon with which the desired sub-ribbons may be broken out by tearing the outer matrix 23 roughly along the line of separation between the sub-ribbons. In the preferred embodiment, a thin layer of matrix 23 will remain adhered to the corresponding matrix 18, 19, 21, or 22, as shown in FIG. 3. These and other characteristics of the material of the outer matrix 23 are as follows:

(a) An elastic modulus at room temperature of 1–400 MPa.
(b) An elastic modulus at 100° C. of 1–100 MPa.
(c) An elastic modulus at temperatures greater than 170° C. of 1–20 MPa.
(d) A glass transition temperature of 50°–100C.
(e) The matrix swells in alcohol more than 15% by volume at least to a swell plateau.
(f) The matrix reaches the percent swell plateau in more than one minute but less than twenty minutes.
(g) The matrix swells less than 5% by volume after 24. hours in commercially available cleaning solvents.
(h) The surface tension of the matrix is 20–35 mJ/m$^2$.

Figure 4:
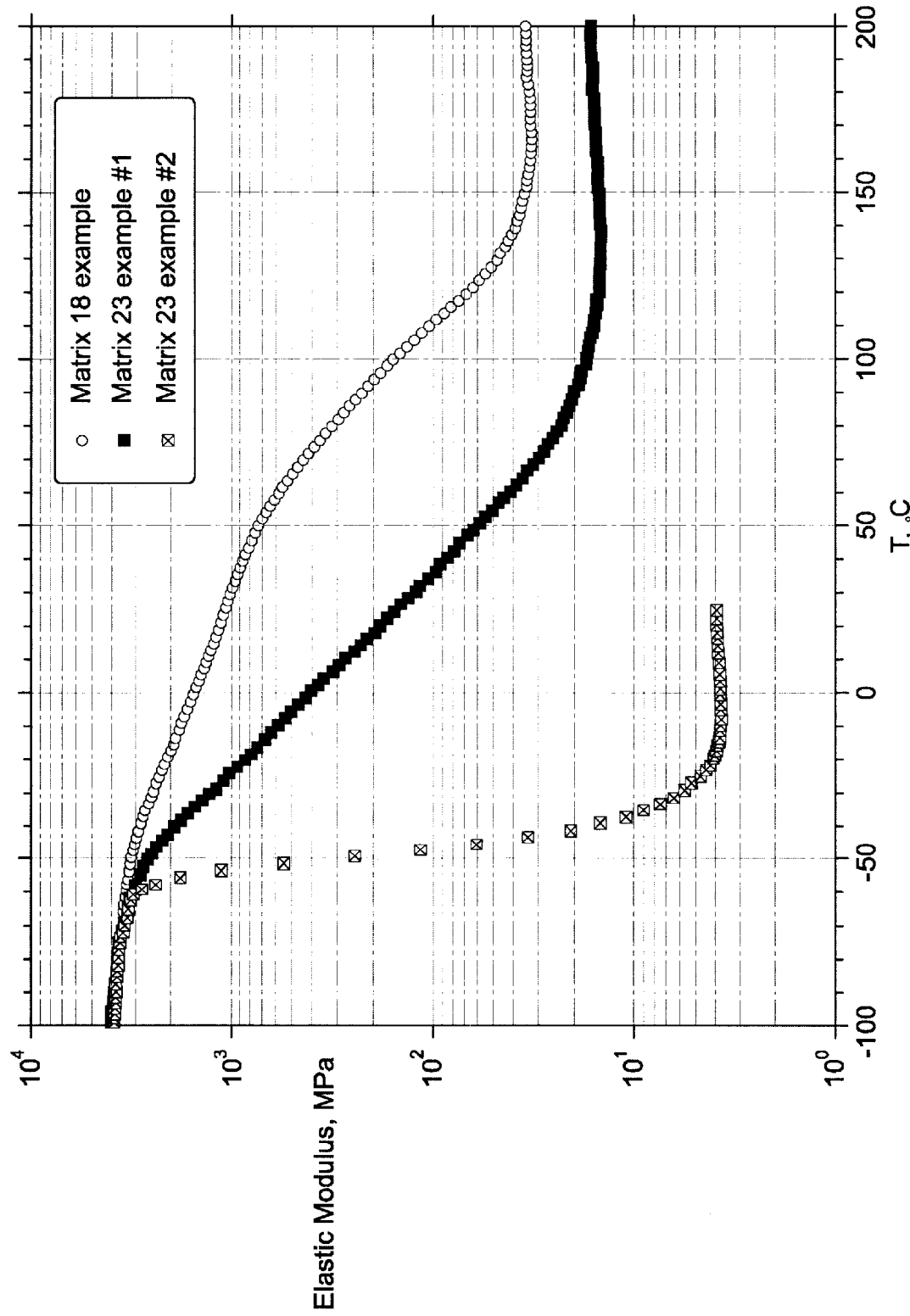
FIG. 4 is a graph of the elastic modulus versus temperature of an example of the inner matrix and two examples of the outer matrix of the ribbon structure of FIG. 1.

FIG. 4 is a graph of the elastic modules E' versus temperature in degrees centigrade for one batch of the material of the outer matrix 23, which comprised a mixture of two commercially available materials, 50% 3287-9-109 and 50% matrix 18, each of which is supplied by DSM Desotech, Inc., and combined by the present inventors to have the foregoing characteristics.

In view of the foregoing, it can be seen that the present invention is an optical fiber ribbon design that eliminates the direct dependency to productive throughput on fibers per ribbon and that provides a robust and stable package on the take-up spool. Thus the same productive throughput of low fiber count ribbons can be made equal to that of high fiber count ribbons. Further, the individual sub-ribbons may be broken out from ribbon without threat of damage to the fibers by tearing the outer matrix along the break-out line. Even if tools are used to separate the outer matrix there is little likelihood that the fibers themselves will be damaged because the fibers have been encased within a protective inner matrix. It is also feasible to have small differences in the elastic moduli and separating as by use of a laser. The greater difference in moduli is, however, to be preferred.

It is to be understood that the various features of the present invention might readily be incorporated into other types of fiber cabling and that other modifications or adaptations might occur to workers in the art. All such variations and modifications are intended to be included herein as being within the scope of the present invention as set forth in the foregoing and in the claims. Further, in the claims hereinafter, the corresponding structures, materials, acts and equivalents of all means or step-plus-function elements are intended to include any structure, material, or acts for performing the functions in combination with other elements as specifically claimed.

What is claimed is:

1. An optical fiber ribbon comprising:
a plurality of substantially parallel longitudinally extending optical fibers forming a substantially planar transverse array encased in a dual matrix;
a first ultra-violet curable matrix bonding material filling interstices between adjacent fibers and surrounding said fibers for bonding said array in ribbon form, said first matrix material having an elastic modulus at room temperature of a minimum value of 400 MPa;
a second outer ultra-violet curable matrix bonding material different from said first ultra-violet curable matrix bonding material overlying said first matrix bonding material and adhered thereto, said second matrix material having an elastic modulus at room temperature less than the minimum value of said first matrix material and a minimum value of approximately 1 Mpa, said second matrix material having a tear strength less than that of said first matrix material the array being separable at high speeds into individual subunits having a dual matrix coating which are capable of use in the manufacture of ribbon fiber optic cable; and the thickness of said second different matrix material is from 10 to 30 µm.

2. An optical fiber ribbon as claimed in claim 1 wherein the elastic modulus of said first matrix material is within the range of 400–1200 MPa at room temperature.

3. An optical fiber ribbon as claimed in claim 2 wherein the elastic modulus of said second matrix material is within the range of 1–400 MPa at room temperature.

4. An optical fiber ribbon as claimed in claim 3 wherein said first matrix material has an elastic modulus at 100° C. of 100–280 MPa and said second matrix material has an elastic modulus at 100° C. of 1–100 MPa.

5. An optical fiber ribbon as claimed in claim 4 wherein said first matrix material has an elastic modulus at temperatures greater than 170° C. of 15–45 MPa and said second matrix material has an elastic modulus at temperatures greater than 170° C. of 1–20 MPa.

6. An optical fiber ribbon as claimed in claim 1 wherein said first matrix bonding material has a surface tension of approximately 20–35 mJ/m$^2$ and said second matrix bonding material has a surface tension of approximately 20–35 mJ/m$^2$.

7. A modular optical fiber ribbon structure comprising:
at least two optical fiber sub-ribbons aligned in substantially parallel relationship, each of said sub-ribbons comprising one or more optical fibers arrayed inside the sub-ribbon;
each of said fibers having at least one layer of coating material;
a first ultra-violent curable matrix bonding material filling the interstices between adjacent fibers and encasing all of the fibers within said sub-ribbon; said matrix material having an elastic modulus at room temperature of approximately 400–1200 MPa; and
a second ultra-violet curable matrix bonding material different from said first material adhered to said first matrix material and encasing said sub-ribbons and filling the interstices therebetween, said second matrix material having an elastic modulus at room temperature of approximately 5–200 Mpa, said second matrix material having a thickness of 10–30 µm and being tearable with respect to said first matrix material without disrupting its adherence thereto at locations remote from the tear.

8. A modular optical fiber ribbon structure as claimed in claim 7 wherein said second matrix bonding material further has an elastic modulus at 100° C. of approximately 1–100 MPa and an elastic modulus at temperatures greater than 170° C. of 1–20 MPa.

9. A modular optical fiber ribbon structure as claimed in claim 8 wherein said first matrix bonding material further has an elastic modulus at 100° C. of approximately 100–280 MPa and an elastic modulus at temperatures greater than 170° C. of approximately 15–45 MPa.

10. A modular optical fiber ribbon structure as claimed in claim 7 wherein each of said sub-ribbons has a plurality of optical fibers arranged in a planar array.

* * * * *